US009008806B2

(12) United States Patent
De Groot

(10) Patent No.: US 9,008,806 B2
(45) Date of Patent: Apr. 14, 2015

(54) SYSTEM AND METHOD FOR AUTOMATICALLY CREATING A LIGHTING EFFECT

(75) Inventor: Bastiaan De Groot, London (GB)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

(21) Appl. No.: 13/816,956

(22) PCT Filed: Aug. 22, 2011

(86) PCT No.: PCT/IB2011/053676
§ 371 (c)(1),
(2), (4) Date: Feb. 14, 2013

(87) PCT Pub. No.: WO2012/025868
PCT Pub. Date: Mar. 1, 2012

(65) Prior Publication Data
US 2013/0293115 A1    Nov. 7, 2013

(30) Foreign Application Priority Data
Aug. 27, 2010  (EP) .................................... 10174277

(51) Int. Cl.
*G05B 13/02*    (2006.01)
*H05B 37/02*    (2006.01)

(52) U.S. Cl.
CPC ........ *H05B 37/0245* (2013.01); *H05B 37/0227* (2013.01); *Y02B 20/44* (2013.01)

(58) Field of Classification Search
USPC ......... 315/292; 340/541, 565; 700/28, 29, 30, 700/31
See application file for complete search history.

(56) References Cited

U.S. PATENT DOCUMENTS 6,263,260 B1    7/2001  Bodmer et al.
6,748,299 B1 *  6/2004  Motoyama .................... 700/286

(Continued)

FOREIGN PATENT DOCUMENTS

EP    1489573 A1    12/2004
FR    2828317       2/2003

(Continued)

OTHER PUBLICATIONS

Kary Framling; "Scaled Gradient Descent Learning Rate", Reinforcement Learning With Light-Seeking Robot, Proceedings of ICINCO '2004, pp. 1-8.

*Primary Examiner* — Thuy Vinh Tran
(74) *Attorney, Agent, or Firm* — Meenakshy Chakravorty

(57) ABSTRACT

The invention relates to automatically configuring of a lighting created by a lighting system, particularly to creating a lighting, which follows a person, with a networked lighting system. A basic idea of the invention is to adapt the learning based processing of activations of lamps and presence detectors received as input data to changes in a system for automatically configuring lighting with a variable adaptation rate in order to make the automatic lighting configuration more robust with regard to system changes. An embodiment of the invention relates to a system (10) for automatically configuring a lighting, wherein the system comprises—a network of lamps (12), wherein each lamp is activated by a control signal and outputs its activation, —a network of presence detectors (14), wherein each presence detector is activated by detecting an activity and outputs its activation, and—a lighting configurator (16) for processing activations of lamps and presence detectors received as input data (18) based on learning and outputting control signals (20) for lamps depending on the processed input data for configuring the lighting, wherein the processing of input data by the lighting configurator can be adapted to changes in the system with a variable adaptation rate (22).

11 Claims, 2 Drawing Sheets

(56) References Cited

U.S. PATENT DOCUMENTS

| | | | |
|---|---|---|---|
| 7,309,965 B2 * | 12/2007 | Dowling et al. | 315/318 |
| 8,543,249 B2 * | 9/2013 | Chemel et al. | 700/295 |
| 8,610,376 B2 * | 12/2013 | Chemel et al. | 315/308 |
| 2003/0160103 A1 | 8/2003 | Guo | |

FOREIGN PATENT DOCUMENTS

| | | |
|---|---|---|
| WO | 2007119126 A2 | 10/2007 |
| WO | 2010051466 A1 | 5/2010 |

\* cited by examiner

SYSTEM AND METHOD FOR AUTOMATICALLY CREATING A LIGHTING EFFECT

TECHNICAL FIELD

The invention relates to automatically configuring of a lighting effect created by a lighting system, particularly to creating a lighting effect which follows a person, with a networked lighting system.

BACKGROUND ART

In the non-pre-published international patent application PCT/IB2010/050836 a system for automatically configuring a lighting is described, which is able to learn to predict which lamp will be the next lamp to turn on. Based on this information a lighting control system can turn lamps on before their connected presence detector will detect activity, increasing the user comfort.

SUMMARY OF THE INVENTION

It is an object of the invention to further improve the automatically configuring of a lighting as described in the non-pre-published international patent application PCT/IB2010/050836.

The object is solved by the subject matter of the independent claims. Further embodiments are shown by the dependent claims.

A basic idea of the invention is to adapt the learning based processing of activations of lamps and presence detectors received as input data to changes in a system for automatically configuring lighting with a variable adaptation rate in order to make the automatic lighting configuration more robust with regard to system changes. Thus, a system for automatically configuring a lighting according to the invention can take into account that noise can occur, particularly when designing a system such as the one described in PCT/IB2010/050836, and there may be a fundamental trade off between how robust such a learning based system is against noise and how fast the system is able to adapt to a new pattern of input data caused by a change in the system configuration. Noise can be for example created by random deviations in the patterns of input data of the input data processing. This follows from the fact that if the configuration of the system changes it will always appear as if the system did not change but is experiencing noise on its original input data pattern. Therefore the more robust a system is against noise the slower it will be in adapting to a new system configuration or a change in usage input data patterns. An input data pattern is a certain pattern of activations of lamps and presence detectors, which are received as input data and processed for the lighting configuration.

An embodiment of the invention provides a system for automatically configuring a lighting, wherein the system comprises:
- a network of lamps, wherein each lamp is activated by a control signal and outputs its activation,
- a network of presence detectors, wherein each presence detector is activated by (in) directly detecting an activity and outputs its activation, and
- a lighting configurator for processing activations of lamps and presence detectors received as input data based on learning and outputting control signals for lamps depending on the processed input data for configuring the lighting, wherein the processing of input data by the lighting configurator can be adapted to changes in the system with a variable adaptation rate.

The lighting configurator may comprise a model of a random process of activations of lamps and presence detectors, wherein the model of the random process is configured:
- to learn patterns of activations of lamps and presence detectors from the received input data,
- to predict a pattern of activations of lamps and presence detectors based on received input data, learned patterns of activations of lamps and presence detectors and a current setting of the adaptation rate, and
- to output the predicted pattern as the control signals.

The lighting configurator may comprise a configurator to lower or increase the adaptation rate. The configurator may particularly enable a user to manually lower or increase the adaptation rate.

Lowering the adaptation rate may comprise at least one of the following:
- changing the amount of historically input data that is used by the model of the random process in the process of learning,
- changing how historically input data is weighted by the model of the random process in the learning process,
- changing a parameter that determines how fast changes are made to the model of the random process that predicts the patterns of activations,
- any action that turns the learning behavior completely on or off,
- setting the adaptation rate such that the model of the random process is not learning at all,
- resetting a memory of the lighting configurator such that all estimations of parameters of the random process are removed, and
- any other action that makes the system adapt the speed with which it adapts its prediction when it receives feedback on whether its predicting model is correct or not.

The lighting configurator may be configured to detect a change in the system in case of one or more events from the group consisting of:
- a user input related to the adaptation rate received by the system via a user interface,
- the adding or removing of a presence detector and/or lamp to/from the network of presence detectors and/or lamps,
- any changes in the network configuration including (relative) signal strengths, routing tables, physical network connections, and
- noise in the model of the random process that matches a set of changes to the system, wherein the set of changes comprises the following: a lamp or presence detector has been added; a lamp or presence detector has been removed/got broken; a lamp or presence detector has been put to another location; the network of lamps and/or presence detectors got portioned.

A further embodiment of the invention relates to a method for automatically configuring a lighting in a system of the invention and as described above, wherein the method comprises:
- processing activations of lamps and presence detectors received as input data, and
- outputting control signals for lamps depending on the processed input data for configuring the lighting, wherein the processing of input data by the lighting configurator can be adapted to changes in the system with a variable adaptation rate.

The act of processing the input data may comprise the model of the random process implemented by a function for predicting whether a lamp i will be activated in a first time step $t_1$ based on all previous events $e_{t2}$ and activation of the lamp i in a second time step $t_2$, wherein an event $e_{tx}$ comprises any information that can be used to predict whether a particular lamp of the network of lamps will be activated in a certain time period $t_x$.

The function may receive as further input a learning rate parameter $L_R$ that indicates how more recent events $e_{t1}$ should be weighted compared to older events $e_{t2}$. The function may comprise:

a first function f that takes as inputs events $E=\{e_{t2}, 0<e_{t2}<e_{t1}\}$ at the second timestep $t_2$, the lamp activation $L=\{l_{it2}, 0<l_{it2}<l_{it1}\}$ at the second timestep $t_2$ and the learning rate parameter $L_R$, and a second function m that is output by the first function and takes as inputs events $E=\{e_{t2}, 0<e_{t2}<e_{t1}\}$ at the second timestep $t_2$ and outputs whether the lamp activation $l_{it1}$ at the first timestep $t_1$ is true or false.

The first function f and the second function m may be combined in one function.

The first function f and/or the second function m may be implemented by at least one of the group consisting of:
a neural network algorithm,
a machine learning algorithm,
a statistical pattern recognition algorithm,
a reinforcement learning algorithm,
a dynamic programming algorithm,
an optimisation function algorithm, and
a genetic algorithm.

In the method, the learning rate parameter $L_R$ may change over the time and/or the acticastion l of a lamp i may be a value indicating a dimming level of the lamp i.

A yet further embodiment of the invention provides a computer being configured to perform a method according to the invention such as a PC (Personal Computer) and comprising an interface to a network of lamps and a network of presence detectors. The computer may execute a program with a graphical user interface, allowing a user to comfortably adjust the adaptation rate for adapting the processing of input data to changes in the system. The computer may be further configured by a program to implement the lighting configurator of the invention.

Another embodiment of the invention provides a computer program enabling a processor to carry out the method according to the invention and as specified above.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
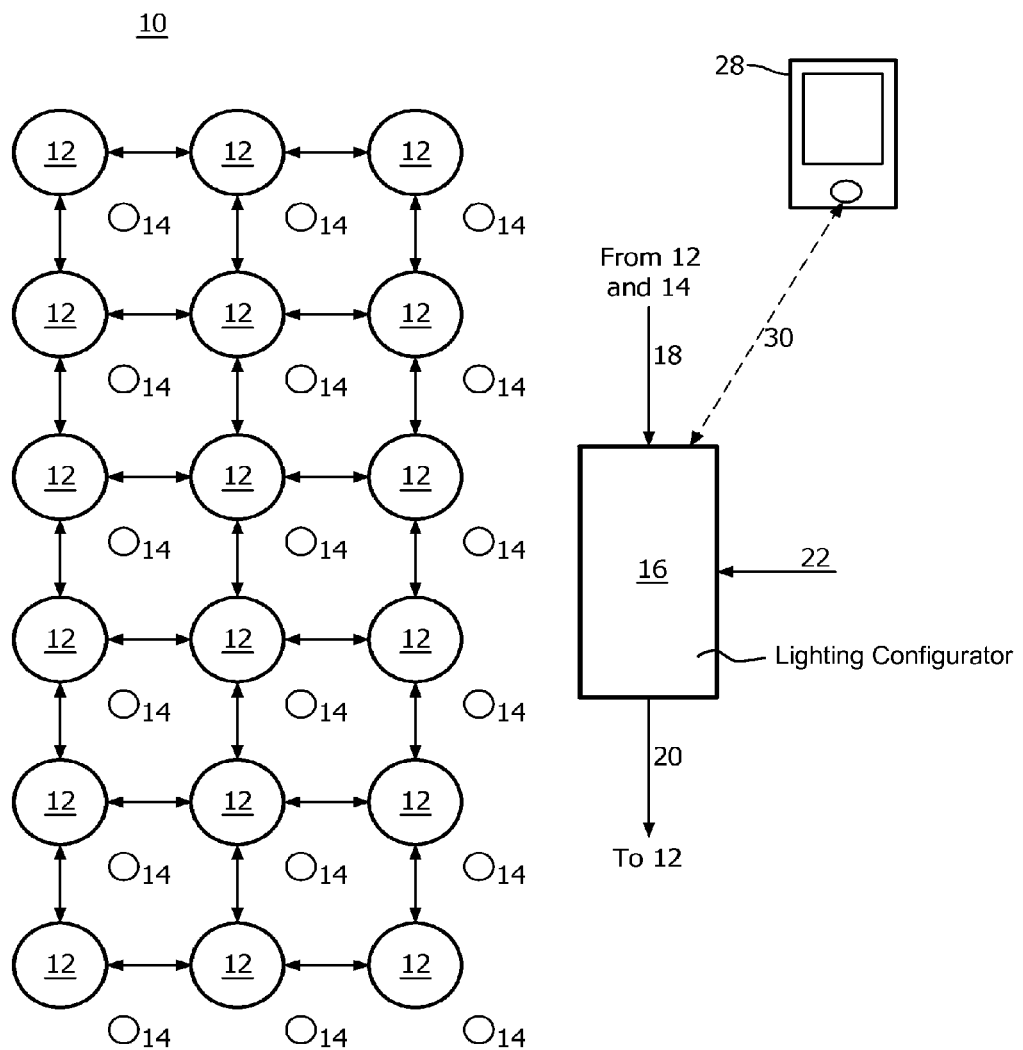
FIG. 1 shows a system for automatically configuring a lighting according to an embodiment of the invention.

In the following, similar functionality or identical elements may have the same reference numerals.

FIG. 1 shows a system 10 for automatically configuring the lighting in a network of lamps 12, each being coupled to a presence or movement detector 14. The shown system 10 can be implemented as described in the non-pre-published international patent application PCT/IB2010/050836, which is incorporated herein by reference. In this system, activations of lamps 12 and presence detectors 14 are processed to configure the lighting. The system described in PCT/IB2010/050836 tries to find patterns in the activation of the presence sensors 14, UI (user interface) switches and activations of the lamps 12. An assumption underlying the system described in PCT/IB2010/050836 is that there is a random process of activations of lamps and presence detectors that generates the data and that by (implicitly) estimating the parameters of this random process the patterns can be predicted as well as possible. The random process is approximated in the system by estimating parameters of the random process and using the estimations for the approximation. Deviations from the approximation can cause an inappropriate configuration of the lighting.

Figure 2:
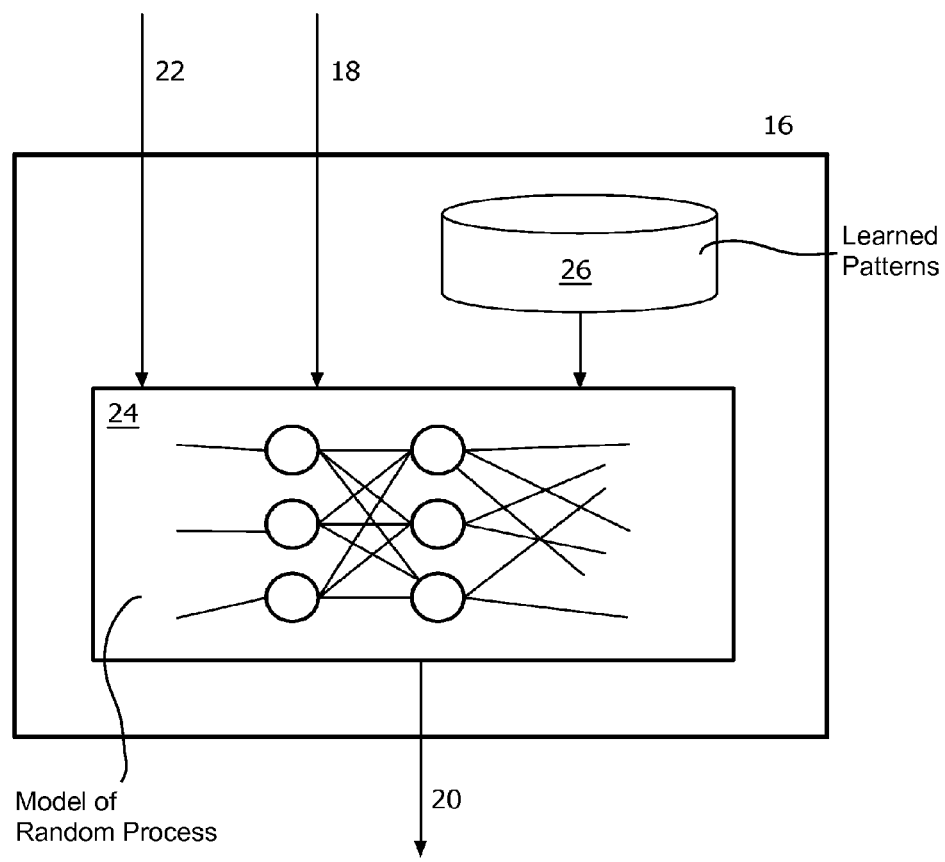
FIG. 2 shows a block diagram of a lighting configurator according to an embodiment of the invention.

The system 10 of FIG. 1 comprises a lighting configurator 16, which is shown in FIG. 2 in detail. The lighting configurator 16 comprises a model 24 of the random process. The model 24 is configured to learn patterns 26 of activations of the lamps 12 and presence detectors 14 from the received input data 18. The learned patterns 26 are stored in a database in the lighting configurator 16. The learned patterns 26 together with the model 24 are an estimation of the parameters of the random process and form an approximation of the random process. The model 24 of the random process processes the received input data 18, i.e. activations of lamps 12 and presence detectors 14 in the system, by using the learned patterns 26 and a current setting of the adaptation rate 22. The processing predicts a certain pattern of activations of lamps and presence detectors, which is output as control signals 20 for the lamps 12 of the system 10.

The lighting configurator 16 can be implemented as a separate apparatus, for example a computer coupled with the network of lamps 12 and presence detectors 14, or also as a distributed system, particularly implemented in the lamps 12, which may comprise an embedded computer to perform tasks of the lighting configurator.

Communication in the system 10 can be wired and/or wireless. For example, the lamps 12 and presence detectors 14 can communicate with the lighting configurator 16 by using a wireless technology such as Bluetooth®, ZigBee™, Wi-Fi™. The lamps 12 can also be implemented to use a Powerline technology to communicate via a LAN (Local Area Network) with the lighting configurator 16.

The presence detectors 14 may be integrated in the lamps 12 and be part of the lamps 12 or implemented as separate devices and broadcast their activation signals. As already mentioned above, the lighting configurator 16 receives as input data 18 activations of lamps 12 and presence detectors 14 and outputs control signals 20 for the lamps 12 in order to configure the lighting of the lamps 12. The lighting configurator 16 receives as further input a variable adaptation rate 22, with which the processing of the input data 18 by the model 24 can be adapted to changes in the system 10, which may cause deviations from the approximation of the random process with the model.

The variable adaptation rate 22 can be for example input by a user via a UI switch of the system 10 or by a device coupled with the system 10, for example a smartphone 28, Tablet-PC, notebook, PDA (Personal Digital Assistant) and comprising a UI for obtaining access to functions of the system 10. FIG. 1 shows a smartphone 28 with a lighting control application (or app), which can communicate 30 with the lighting configurator 16 of the system via some kind of wireless technology such as Wi-Fi™ or a 3G mobile communication technology. With the app, a user can adjust the variable adaptation rate 22 by using the smartphone.

As mentioned before, changes in the system 10 can cause deviations from a current approximation of the random process underlying the automatic configuring of the lighting. Deviations can in principle be caused by two events: The deviations are caused by noise in the random process and/or the random process generating the random data has changed for example (due to a system change):
- A lamp has been added.
- A lamp has been removed/got broken.
- A lamp has been put in another location.
- A sensor has been added.
- A sensor has been removed/broken.
- A sensor has been put in another location.
- The network got portioned.

There is fundamentally no way to differentiate between these two events. The only thing that can be done is changing the speed with which the estimation of the random process is adapted. The adaption of the estimation of the random process can be performed with the variable adaptation rate 22. The adaptation rate 22 is herein also called the learning rate since it influences a learning of the random process to varying input data.

The learning rate can vary between no learning at all, usually depicted as 0, and only taking into account the last received information, usually depicted as 1. Choosing the right setting for the learning rate is therefore balancing between a system that will adapt very quickly whenever the system is changed but is not very robust against noise, and a system that is very robust against random noise but will not learn changes to the random process very fast. In the system 10, the learning rate can be varied based on evidence that the random process has changed.

The learning rate should be lowered when a user suspects or knows that the setup of the system has changed and increased when a user is very confident that her/his estimation that the learning rate is correct. This includes setting the learning rate such that the system is not learning at all, or resetting the memory of the learning system such that all estimations of the random process are removed.

The indicators that can be used to adapt the current setting of the learning rate include:
A user action using some sort of interface explicitly make changes, including:
  Changing the system to non-learning.
  Resetting the system to forget all current estimations of the model behind the random process.
  Setting the learning rate to any other speed.
  The adding or removing of a sensor and or lamp to the network.
  Changing the communication network including routing tables, signal strengths, physical connections.
Noise in the random process that matches a limited set of changes to the system, including:
  A lamp has been added.
  A lamp has been removed/broken.
  A lamp has been put in another location.
  A sensor has been added.
  A sensor has been removed/broken.
  A sensor has been put in another location.
  The network got portioned.

In the following, an embodiment of a method for automatically configuring a lighting in the system 10 is described. The method may be implemented in the lighting configurator 16, and processes the input data 18 and creates the control signals 20 for the lamps for configuring the lighting. First, some important terms used for the description are defined:

An Event is any information that can be used to predict whether a particular lamp will turn on in a particular time period. The letter e is used to indicate an event Lamp activation at time step t, with $l_{it}$ it is indicated whether lamp I was on or off in timestep t. The letter $e_t$ indicates all events that were received within in timestep t, this includes all activations of other lamps.

A Model of the random process is a function that predicts whether 1, will be on in a certain timestep $t_1$ based on all previous events and activation $e_{t2}$ and $l_{it2}$ where $0<t_2<t_1$. The problem is to estimate $l_{t1}$ based on $\{e_{t2}, 0<e_{t2}<e_{t1}\}$). In order to do this, a higher order function f is created that takes as in input $E=\{e_{t2}, 0<e_{t2}<e_{t1}\}$, $L=\{l_{it2}, 0<l_{it2}<l_{it1}\}$ and learning rate parameter $L_R$ that indicates how more recent information should be weighted compared to older information. This parameter is not limited to be a single number but could also be a function, a vector, a matrix or any other form. The function f outputs another function m that takes as input $\{e_{t2}, 0<e_{t2}<e_{t1}\}$ and outputs whether $l_{t1}$ is true or false.

Further embodiments of the above described method are listed in the following:

Functions f and m could be combined in one function where the output is given directly. It could even be the case that functions f and m are not explicitly separated when they are combined.

Learning rate parameter $L_R$ can be changing over time (for a list of indicators that could be used to alter $L_R$ see above).

Functions f and/or m can be implemented using a wide variety of technologies including (but not limited to):
neural networks,
machine learning,
statistical pattern recognition,
reinforcement learning,
dynamic programming,
optimisation functions, and
genetic algorithms.

Lamp activation $L_i$ could not only have a value depicting on or off, but could also indicate a dimming level between off and a certain maximum.

This system could work for both one or multiple users at the same time. The invention can be used in all kinds of lighting systems in which the lighting system should "think ahead" of where a person is going and turn the lights on in advance so the person can already see where she/he is going. The invention could however also be used in other situations, such as in decorative or art systems in which the system somehow follows the user for example by decorative light, video or computer images projected on the wall or ceiling, or with other output modalities such as sound and water.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for automatically configuring a lighting, the system comprising:
   a network of lamps, wherein each lamp is activated by a control signal and outputs its activation result,
   a network of presence detectors, wherein each presence detector is activated by detecting an activity and outputs its activation result, and
   a lighting configurator comprising a model of a random process of activations of the lamps and the presence detectors, wherein the model of the random process is configured to learn patterns of current activations of the lamps and the presence detectors received as input data from the lamps and the presence detectors, to predict a pattern of activations of the lamps and the presence detectors based on the received input data, the learned patterns of activations, and a current setting of an adaptation rate, and to output the predicted pattern of activations as the control signals for the lamps, wherein the predication of the pattern of activations of the lamps and the presence detectors is adapted to changes in the system by variation of the adaptation rate.

2. The system of claim 1, wherein the lighting configurator is configured to alter the adaptation rate.

3. The system of claim 2, wherein altering the adaptation rate comprises one of the following:
   changing an amount of historically input data used by the model of the random process in the learning process,
   changing how historically input data is weighted by the model of the random process in the learning process,
   changing a parameter that determines how fast changes are made to the model of the random process that predicts the patterns of activations,
   turning the learning process completely on or off,
   resetting a memory of the lighting configurator such that all estimations of parameters of the random process are removed,
   adapting speed with which the system adapts the model of the random process when it receives feedback on whether or not the predicting is correct.

4. The system of claim 1, wherein the lighting configurator is configured to detect a change in the system in case of an event from a group consisting of:
   a user input related to the adaptation rate received by the system via a user interface,
   adding at least one of a presence detector and a lamp to the network,
   removing at least one of a presence detector and a lamp from the network,
   changes in configuration of the network including signal strengths, routing tables, and physical network connections,
   noise in the model of the random process that matches a set of changes to the system, wherein the set of changes comprises the following: adding a lamp or presence detector; removing or breaking a lamp or presence detector; relocating a lamp or presence detector, and
   portioning the network of the lamps and the presence detectors.

5. A method for automatically configuring a lighting in a system comprising a network of lamps, wherein each lamp is activated by a control signal and outputs its activation result, and a network of presence detectors, wherein each presence detector is activated by detecting an activity and outputs its activation result, the method comprising:
   learning patterns of current activations of the lamps and the presence detectors received as input data from the network of the lamps and the network of the presence detectors;
   predicting a pattern of activations of the lamps and the presence detectors based on processing the received input data, the learned patterns of activations of the lamps and the presence detectors, and a current setting of an adaptation rate; and
   outputting the predicted pattern as the control signals for the lamps,
   wherein predicting the pattern of activations of the lamps and the presence detectors is adapted to changes in the system by variation of the adaptation rate.

6. The method of claim 5, wherein processing the received input data comprises a model of a random process implemented by a function for predicting whether a lamp (i) will be activated in a first time step ($t_1$) based on all previous light activation events ($e_{t2}$) of the lamp (i) in a second time step ($t_2$).

7. The method of claim 6, wherein the function receives, as further input, a learning rate parameter ($L_R$) that indicates weighting of more recent events ($e_{t1}$) compared to previous light activation events ($e_{t2}$).

8. The method of claim 7, wherein the function comprises
   a first function (f) that receives as inputs events E={$e_{t2}$, 0<$e_{t2}$<$e_{t1}$} at the second time step ($t_2$), lamp activation L={$li_{t2}$, 0<$li_{t2}$<$li_{t1}$} at the second time step (t2) and the learning rate parameter ($L_R$), $li_{t2}$ being previous activations of the lamp (i) at the second time step ($t_2$); and
   a second function (m) that is output by the first function (f) and takes as inputs the events E={$e_{t2}$, 0<$e_{t2}$<$e_{t1}$} at the second time step ($t_2$) and outputs whether the lamp activation ($li_{t1}$) at the first time step ($t_1$) is true or false, indicating whether the lamp (i) will be on or off, respectively.

9. The method of claim 8, wherein the first function (f) and the second function (m) are combined in one function.

10. The method of claim 8, wherein at least one of the first function (f) and the second function (m) is implemented by one of a group consisting of:
    a neural network algorithm,
    a machine learning algorithm,
    a statistical pattern recognition algorithm,
    a reinforcement learning algorithm,
    a dynamic programming algorithm,
    an optimisation function algorithm, and
    a genetic algorithm.

11. The method of claim 7, wherein:
    the learning rate parameter ($L_R$) changes over time, or
    the activation of the lamp (i) is a value indicating a dimming level of the lamp (i).

* * * * *